United States Patent Office 2,968,650
Patented Jan. 17, 1961

2,968,650

INTERPOLYMERIZATIONS OF ETHYLENE AND BUTADIENE

Warren Nesmith Baxter and Ivan Maxwell Robinson, Wilmington, Del., assignors to E. I. du Pont de Nemours and Company, Wilmington, Del., a corporation of Delaware No Drawing. Filed Oct. 15, 1954, Ser. No. 462,608

7 Claims. (Cl. 260—85.3)

This invention relates to novel solid copolymers of ethylene and diolefins and more particularly to solid polymers of ethylene and butadiene made by novel catalyst systems.

Heretofore it has been widely known that ethylene and diolefins such as butadiene can each be converted to high molecular weight polymers in the presence of catalysts which are capable of yielding free radicals under polymerization conditions. Certain ethylene-butadiene copolymers have been disclosed, but it has not been possible to obtain commercially useful high molecular weight copolymers of ethylene and butadiene (or other diolefins) probably because of deficiencies in the properties of the prior art copolymers. The molecular weight of these polymers evidently was too low, unless they were treated after polymerization with crosslinking agents to increase the molecular weight thereof and impart strength and toughness necessary for commercial applications. The absence of practical applications for interpolymers of ethylene and butadiene, in view of the art existing on the polymerization of ethylene and the polymerization of butadiene, is indicative of the difficulty of obtaining useful interpolymers from these two monomers by the previously known methods.

It is therefore an objective of this invention to prepare solid, tough interpolymers of ethylene and butadiene. A further objective of this invention is to prepare solid tough interpolymers of ethylene and butadiene by a process using a novel catalyst system.

It has now been discovered in accordance with the present invention that extraordinary and highly useful polymers can be prepared by the interpolymerization of ethylene and butadiene using a novel catalyst system. It has been found that divalent titanium compounds or titanium compounds having titanium of a valence state higher than 2, if combined with a reducing agent, as hereinbelow set forth, which reduces the valence of titanium so as to produce at least some titanium at a valence of 2, can be used effectively in the interpolymerization of ethylene and butadiene to give solid tough interpolymers.

Among the reducing agents which are most effective for reducing the valence of the titanium to below 3, the following may be mentioned:

(1) Grignard reagents.
(2) Metal alkyls and similar organometallic compounds.
(3) Metal hydrides, e.g. simple metal hydrides, aluminum borohydride, etc.
(4) Zinc metal and metals above zinc in the electromotive series.

Various specific embodiments of this novel catalyst system are described in greater detail in copending U.S. patent applications S.N. 450,243, filed August 16, 1954, now U.S. 2,905,645, issued September 22, 1959. The catalytic activity of the titanium in its low state of valence is believed to be due to its ability to coordinate with ethylenically unsaturated compounds such as ethylene and is of such a nature that it will cause the formation of surprisingly high molecular weight polymers from ethylenically unsaturated monomers under the conditions herein disclosed. Similar complexes, effective in the polymerization of ethylenically unsaturated compounds, are also formed from compounds of other metals such as zirconium, vanadium, niobium, tantalum, tungsten, chromium and molybdenum.

In contrast with polymerizations of ethylene, generally practiced at high temperatures and pressures, and polymerizations of butadiene practiced at very low temperatures, the novel polymers of this invention are preferably obtained by polymerizing at moderate temperatures and moderate pressures, but higher or lower pressures and temperatures may be employed if it is desired to do so. Temperatures higher than 150° C. should generally be avoided so as to prevent the formation of low molecular weight, brittle polymers. This is illustrated by Example 5 in which a borderline case of high molecular weight polymer was prepared.

The quantity of the catalyst employed can be varied over a rather wide range. It is desirable to employ a quantity of catalyst which is at least large enough to produce reasonably rapid rate of polymerization for a reasonably long period of time. In general, the quantity is within the range of 0.001 to 10% based on the unit weight of monomer.

The interpolymerization of ethylene and butadiene according to the process of this invention takes place most satisfactorily when the polymerization mixture is substantially moisture-free and also free of other sources of hydroxyl groups. The polymerization process should be kept free of oxygen or at least the oxygen content should be held below 20 parts per million. Certain compounds which are capable of coordinating with the titanium at a valence state of 2 form complexes which are too stable for optimum results and, accordingly, the presence of these compounds should preferably be avoided. In this category are acetone and esters. Hydrocarbon solvents, on the other hand, can be used effectively as reaction media.

The interpolymers of ethylene and butadiene obtained from the process of this invention are tough, thermoplastic polymers, being compression moldable at about 200° C. These interpolymers may be fabricated into articles by methods common to most thermoplastic polymers such as compression molding, injection molding, etc. Some of the interpolymers may be drawn below their melting point to twice their length, and they may be repeatedly flexed without showing cracks and breaks common to brittle plastics. Thus the interpolymers of ethylene and butadiene differ considerably from the gums and brittle solids of ethylene and butadiene obtained by prior art processes. The difference in properties is partially due to the high molecular weight obtained using the highly reactive novel catalyst described hereinabove. It is believed that the interpolymers of ethylene and butadiene made with these novel catalysts differ structurally from prior art polymers. However, analytical techniques have not progressed to such an extent as to distinguish between polymers varying only slightly in structure, especially since these polymers are novel in themselves. Therefore the interpolymers of ethylene and butadiene made by the process of this invention have to be defined in terms of their properties and the method of their preparation.

The interpolymer of the present invention may be said to be a tough, useful, thermoplastic polymer, in contrast to prior art polymers which may be semi-solid gums or brittle solids which gain usefulness only by being crosslinked with other chemicals and thus no longer are interpolymers of solely ethylene and butadiene. The interpolymers of this invention do not require further modifications, but can be drawn at room temperatures, molded and extruded by heating above the melting point. The presence of the residual unsaturation in the molecular chain may of course be used to further alter the properties of the polymer if such is desired.

In determining the usefulness of interpolymers of ethylene and butadiene the melt index test has been used to differentiate brittle polymers having high melt index values from tough polymers having low melt index values. The melt index test measures the flow rate of the polymer at a specified temperature above the melting point of the polymer through a standard orifice under a specified load. The test is described in greater detail in ASTM specifications as ASTM-D-1238-52-T. Thus melt index values of brittle interpolymers of ethylene and butadiene are in the range of 500 and higher, whereas melt index values of tough polymers are below 300 and preferably below 10. A borderline case has been given in Example 5, in which a polymer having a melt index of 360 was made. This polymer could not be extensively cold drawn.

The ratio of ethylene to butadiene in the interpolymer produced by the process of this invention may be varied over a large range although preferably the ratio of ethylene to butadiene should be greater than one to obtain the outstanding properties desired.

The invention is illustrated further by means of the following examples:

*Example 1.*—Titanium tetrachloride (4 grams, 0.02 mole) was dispersed in 200 ml. of cyclohexane and 26 cc. of a 3 molar ethereal solution of phenyl magnesium bromide (0.08 mole) was added rapidly under a blanket of nitrogen. The mixture was shaken vigorously for 10 minutes, filtered under nitrogen, and the solid dried at room temperature (1.0 mm.) to yield 17 grams of a black powder which was pyrophoric.

A mixture of 3 grams dry solid catalyst (prepared as described in the example) and 100 ml. of cyclohexane was introduced into a 325 ml. shaker tube. Butadiene (25 grams) was added, and the mixture was pressured to 500 p.s.i. with ethylene. The tube was shaken at room temperature for 2 hours. The product was filtered, washed, and dried. The yield of copoylmer having an inherent viscosity of 5.7 (decahydronaphthalene) was 32 grams. A film pressed at 200°, 20,000 p.s.i. for 3 minutes had a density of 0.93 and was very tough. A qualitative infrared determination showed this copolymer to contain about 10% butadiene. The polymer was found to have a melt index of below 0.1.

*Example 2.*—Titanium tetrachloride (0.067 mole) was dispersed in 100 ml. of toluene and 0.015 mole of lithium aluminum hydride was added under a blanket of nitrogen. The resulting reaction caused the formation of a black solid. This mixture was introduced into a 325 ml. shaker tube. The shaker tube was cooled to −50° C., flushed with nitrogen, evacuated, and 27 grams of butadiene were added. The shaker tube was then pressured to 500 p.s.i. with ethylene, and agitated for 1 hour at 100° C. The resulting polymer was filtered, washed and dried. The yield of the dry polymer was 59 grams. The polymer having a density of 0.96 could be compression molded at 200° C. into a film. A qualitative infrared determination showed this copolymer to contain between 15 and 20% butadiene.

*Example 3.*—Titanium tetrachloride (0.01 mole) was dispersed in 100 ml. of toluene and 0.02 moles tetrabutyl lithium aluminum, prepared from lithium aluminum hydride, and butene-1 was added under a blanket of nitrogen. The resulting reaction caused the formation of a black solid dispersed in toluene. This mixture was introduced into a 325 ml. shaker tube. The shaker tube was cooled to −50° C., flushed with nitrogen, evacuated and 27 grams of butadiene were added. The shaker tube was then pressured to 500 p.s.i. with ethylene and agitated for one hour at 100° C. The resulting polymer was filtered, washed and dried. The yield of the dry interpolymer was 20 grams. The interpolymer having a density of 0.96 could be compression molded at 200° C., 35,000 p.s.i., for 3 minutes, into a tough film. A qualitative infrared determination showed this interpolymer to contain about 10% butadiene. The polymer was found to have a melt index of 0.25.

*Example 4.*—Into a shaker tube was placed 100 ml. of cyclohexane having therein dispersed 0.03 mole of titanium tetrachloride. To this mixture 1.5 grams of a 50% dispersion of sodium in xylene and 100 ml. of cyclohexane was added and the resulting mixture heated for one hour. The shaker tube was cooled to −50° C., flushed with nitrogen, evacuated and 27 grams of butadiene were added. The shaker tube was then pressured to 500 p.s.i. with ethylene and agitated for one hour at 75° C. The resulting polymer was filtered, washed and dried. The yield of the interpolymer was 19 grams, it was found to have a density of 0.95, and could be compression molded at 200° C., 35,000 p.s.i., for 3 minutes, into a tough film. The polymer was found to have a melt index of less than 0.1.

*Example 5.*—A mixture of .03 M $TiCl_4$ and .01 M Al dust were dispersed in 100 ml. of toluene under a blanket of nitrogen. The resulting reaction product was introduced into a 325 ml. shaker tube. The shaker tube was cooled to −50° C., flushed with nitrogen, evacuated, and 0.5 mole of butadiene and 2 moles of ethylene were added. The tube was then agitated for 1 hour at 150° C. under autogenous pressure. The resulting polymer was filtered, washed and dried. The yield of dry polymer was 54 grams. A film that could not be extensively cold drawn was obtained on compression molding the polymer, which was found to have a melt index of 360.

The polymers which are made under the conditions hereinabove described frequently have such high molecular weights that removal of catalysts by dissolving and filtering is extremely difficult. The best procedure for obtaining the polymer in a clean form is to wash with acetone and methanol-hydrochloric acid mixtures followed by washing with acetone and acetone-aqueous sodium hydroxide mixtures and finally followed by a water wash. The products thus obtained are generally white. Other washing procedures will be apparent to those skilled in the art.

The interpolymers of ethylene and butadiene obtained in accordance with the process of this invention are highly valuable in numerous applications, especially in the form of films, molded articles, extruded insulation on wire, fibers, elastomers, etc.

We claim:
1. A process for the preparation of ethylene-butadiene interpolymers which comprises contacting ethylene and butadiene in the presence of an inert, liquid hydrocarbon medium with from 0.001 to 10%, on the basis of the monomer, of a catalyst containing titanium at a valence state of two obtained by contacting reducible titanium having a valence above two with sufficient quantity of a reducing agent to reduce the titanium to a valence state of two.

2. A process for the preparation of ethylene-butadiene interpolymers which comprises contacting ethylene and butadiene with from 0.001 to 10%, on the basis of the monomer, of a catalyst in the presence of an inert liquid hydrocarbon medium, said catalyst being the reaction product obtained on admixing a titanium chloride, wherein the titanium is at a valence state above two, with a reducing agent of the class consisting of aluminum-containing organometallic compounds, aluminum-containing metal hydrides and aluminum metal, said reducing agent being employed in sufficient quantity to reduce the titanium to a valence state of two.

3. A process for the preparation of ethylene-butadiene interpolymers which comprises contacting ethylene and butadiene with from 0.001 to 10%, on the basis of the monomer, of a catalyst in the presence of an inert, liquid hydrocarbon medium, said catalyst being the reaction product obtained by admixing a titanium chloride, wherein the titanium chloride is at a valence state above two, with an aluminum containing organometallic compound, said organometallic compound being employed in sufficient quantity to reduce the titanium to a valence state of two.

4. The process as set forth in claim 3 wherein the aluminum-containing organometallic compound is a lithium aluminum tetraalkyl.

5. The process for the preparation of ethylene-butadiene interpolymers which comprises contacting ethylene and butadiene at a temperature of 0° to 150° C. and at a pressure of 1 to 200 atmospheres in the presence of an inert liquid hydrocarbon with from 0.001 to 10%, on the basis of the monomer, of a catalyst formed by admixing a titanium tetrachloride with a lithium aluminum tetraalkyl, said lithium aluminum tetraalkyl being employed in sufficient quantity to reduce the titanium to a valence state of two.

6. A process for the preparation of ethylene-butadiene interpolymers which comprises contacting ethylene and butadiene, said ethylene and butadiene being employed in a ratio of ethylene to butadiene of greater than one, at a temperature of 0 to 150° C. and at a pressure of 1 to 200 atmospheres in the presence of an inert liquid hydrocarbon with a catalyst consisting essentially of the product obtained by admixing titanium tetrachloride with sufficient quantities of lithium aluminum tetraalkyl to reduce said titanium to a valence state of two, said catalyst being employed in a quantity of 0.001 to 10% by unit weight of monomer.

7. The process as set forth in claim 6 wherein the lithium aluminum tetraalkyl is lithium aluminum tetrabutyl.

References Cited in the file of this patent

UNITED STATES PATENTS

| | | |
|---|---|---|
| 2,200,429 | Perrin et al. | May 14, 1940 |
| 2,440,498 | Young et al. | Apr. 27, 1948 |
| 2,491,116 | Kraus et al. | Dec. 13, 1949 |
| 2,721,189 | Anderson et al. | Oct. 18, 1955 |
| 2,905,645 | Anderson et al. | Sept. 22, 1959 |

FOREIGN PATENTS

| | | |
|---|---|---|
| 826,993 | France | Jan. 18, 1938 |

OTHER REFERENCES

Gilman and Jones: "Organometallic Compounds of Titanium, Zirconium and Lanthanum," Journal of Org. Chem., vol. 10 (November 1945), pages 505–514.